United States Patent [19]

Wallis

[11] Patent Number: 4,507,948
[45] Date of Patent: Apr. 2, 1985

[54] METHOD AND APPARATUS FOR CUTTING CORRUGATED STRIP

[76] Inventor: Bernard J. Wallis, 25315 Kean Ave., Dearborn, Mich. 48124

[21] Appl. No.: 548,711

[22] Filed: Nov. 4, 1983

[51] Int. Cl.³ .............................................. B21D 53/02
[52] U.S. Cl. .......................................... 72/185; 72/187
[58] Field of Search ................ 72/185, 187, 195, 196; 29/157.3 R, 157.3 B

[56] References Cited

U.S. PATENT DOCUMENTS

| | | | |
|---|---|---|---|
| 767,883 | 8/1904 | Grafton | 72/185 |
| 1,849,944 | 3/1932 | Medville | 72/187 |
| 3,988,917 | 11/1976 | Mykolenko | 72/187 |

Primary Examiner—Lowell A. Larson
Attorney, Agent, or Firm—Barnes, Kisselle, Raisch, Choate, Whittemore & Hulbert

[57] ABSTRACT

A machine on which metal ribbon stock is corrugated has a toothed feed roll which engages the corrugated strip between successive corrugations to advance the strip lengthwise. Downstream from the feed roll is arranged one or more rotary-driven, toothed, unpacking rolls that are rotatably adjustable relative to the feed roll to stretch the corrugated strip advanced by the feed roll a predetermined amount so that, when the strip is cut to length at a further downstream station, it will have the desired number of corrugations per unit length.

16 Claims, 9 Drawing Figures

HAND SET PROPER COUNT

METHOD AND APPARATUS FOR CUTTING CORRUGATED STRIP

This invention relates to the manufacture of heat exchanger strip; that is, a metal strip having transversely extending corrugations along the length thereof.

Manufacturers of heat exchangers which utilize such corrugated strips usually specify a predetermined number of convolutions per unit length of the strip. The corrugated strip is usually formed as a continuous length by directing flat ribbon strip from a reel to between a pair of toothed-form rolls which bend the strip transversely into successive corrugations which are normally spaced apart a distance greater than desired in the finished product. The corrugated strip is then compressed lengthwise to form a more acute bend at the crests of the convolutions and thus bring the convolutions closer together. Thereafter, in order to cut the strip into successive sections of predetermined length while it is being advanced, some type of mechanical device is normally utilized to count the convolutions between successive cuts so that, when a plurality of corrugated sections are assembled into a heat exchanger, each will contain the number of convolutions per unit length specified by the customer.

When the ribbon stock from which the corrugated strip is formed is quite flexible and resilient, most of the convolution counting mechanisms operate satisfactorily because the flexible and resilient corrugated strip will readily expand or contract itself to the spacing between crests of the convolutions required by the design of the counting mechanism. However, where the strip material is rather stiff and has a low spring-back characteristic, as is true of many aluminum alloys, the conventional counting mechanisms employed do not always perform satisfactorily.

The object of the present invention is to provide a relatively simple apparatus for advancing corrugated strips formed of metal which has little resiliency in a manner which enables the number of convolutions per unit length to be accurately controlled while the strip is being advanced so that, when the strip is cut into successive lengths, each will have the desired number of convolutions therein.

More specifically, the invention contemplates an apparatus which includes a pair of rotary-driven toothed rolls spaced apart in a straight path and arranged to engage between the successive convolutions in a strip of corrugated stock to advance the strip lengthwise. The downstream roll is rotatably adjustable relative to the other to stretch the corrugated sections of the strip between them so that it contains the desired number of corrugations and can thereafter be cut to the proper length by a counting mechanism designed to accommodate the specified crest spacing. The adjustment mechanism is designed such that, when a fresh length of ribbon stock is fed through the machine, as from another coil, the adjustable roll can be first manually rotated to engage between the crests of the compacted corrugated strip and then automatically adjusted to its proper setting to stretch the strip the required amount as produced by the previous run on the machine.

Other objects, features and advantages of the present invention will become apparent from the following description and accompanying drawings, in which:

FIG. 5 is a perspective view of a typical unpacking roll employed in the apparatus;

FIG. 6 is a fragmentary sectional view taken along the line 6—6 in FIG. 5;

Figure 1:
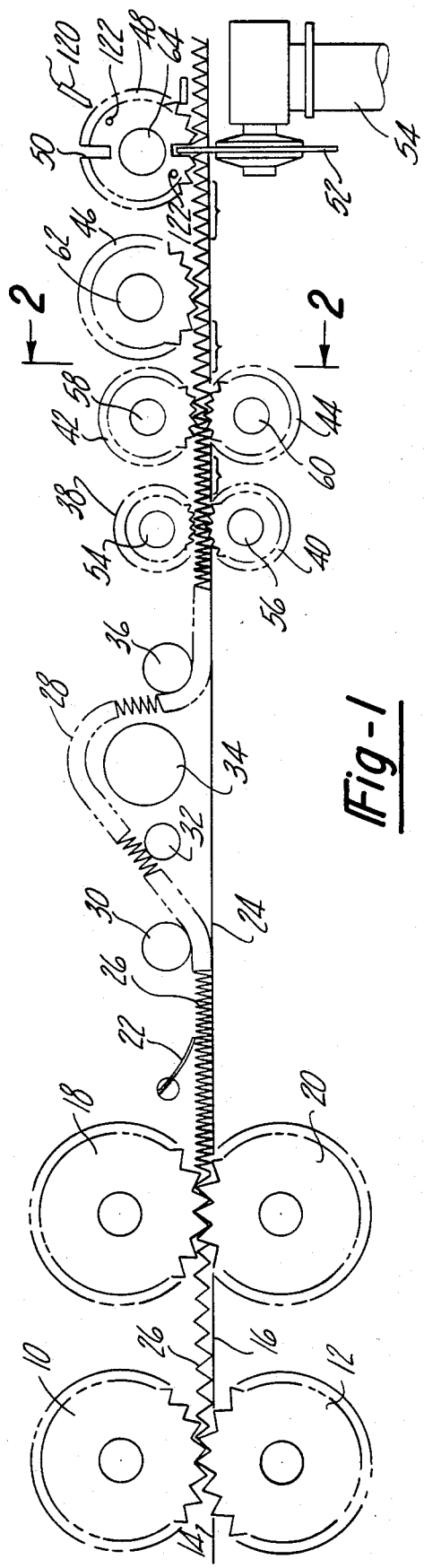
FIG. 1 is a somewhat diagrammatic elevational view of an apparatus for forming corrugated strip and cutting it to length in accordance with the present invention.

Referring first to FIG. 1, there is illustrated a corrugated fin rolling machine, several features of which are conventional. The machine includes a pair of form rolls 10,12 mounted on the frame of the machine and in intermeshing relation as illustrated. Sheet metal ribbon stock 14 is fed from a coil (not illustrated) between form rolls 10,12 so as to form corrugations therein. The corrugated strip is designated 16 and is directed from rolls 10,12 downstream to a pair of gathering rolls 18,20 which advances the corrugated strip toward a spring pressure plate 22. Pressure plate 22 cooperates with a bottom supporting rail 24 on which the corrugated strip is advanced to frictionally retard the forward movement of the corrugated strip so that it is compacted or compressed lengthwise by further bending at the crests of the convolutions. It will be observed that the crests 26 of the corrugated strip are spaced much closer together in the section of the strip between rolls 18,20 and spring plate 22 than are the corrugations of the section of the strip between rolls 10,12 and 18,20. When the strip 14 is formed from some types of aluminum alloys, the metal has little resiliency and negligible spring-back characteristics. Thus, the spacing between the successive convolutions 26 in any section along the length of the corrugated strip tends to remain the same unless this spacing is changed by either stretching or compacting the strip lengthwise. After the strip is fed forwardly past spring plate 22, it is advanced around idle rolls 30,32,34,36 to form a take-up loop 28. The provision of this loop 28 is desirable since, as explained hereinafter, the upstream rollers 10,12 and 18,20 are rotated continuously while the rolls downstream from roll 36 are operated intermittently. Thus, the loop 28 increases in size when rotation of the downstream rolls is arrested and then becomes progressively smaller when rotation of the downstream rolls is resumed. Since loop 28 freely expands and contracts in size, it follows that the corrugated strip is neither stretched nor compressed as it advances through the loop. Thus, the crest spacing in this section of the strip remains relatively constant and is substantially the same as produced by the action of spring plate 22.

Downstream from rolls 36 there is arranged a pair of toothed feed rollers 38,40 spaced vertically apart so that the teeth on the upper roll 38 engage between the successive upper crests of the corrugated strip and the teeth on the lower roll 40 engage between the successive lower crests on the corrugated strip. The pitch of the teeth on rolls 38,40 corresponds generally with the spacing between the successive crests on the section of the corrugated strip between spring plate 22 and the rolls 38,40.

At a location spaced downstream from rolls 38, 40 there is arranged a second pair of rolls 42,44 which are also spaced vertically apart to engage between the successive upper and lower crests of the corrugated strip in the same manner as the teeth of rolls 38,40. An additional roll 46 is located downstream in the path of travel of the corrugated strip from rolls 42,44. Roll 46 is supported above the strip so that the teeth thereof engage between the top crests of the strip advancing on rail 24. Downstream from the roll 46 there is journalled a further toothed roll 48. The roll 48 is formed with a pair of diametrically opposite slots 50 for accommodating a rotary saw blade 52 that is reciprocated vertically intermittently by a cylinder 54 or other suitable means.

Rolls 38,40 will hereinafter be referred to as "feed rolls" and rolls 42,44,46 will be referred to hereinafter as "unpacking rolls". Feed rolls 38,40 are keyed or otherwise fixed to rotate with shafts 54,56. Unpacking rolls 42,46 are supported to rotate on shafts 58, 62, respectively. Unpacking roll 44 is keyed to shaft 60 and roll 48 is keyed to rotate with shaft 64.

Figure 2:
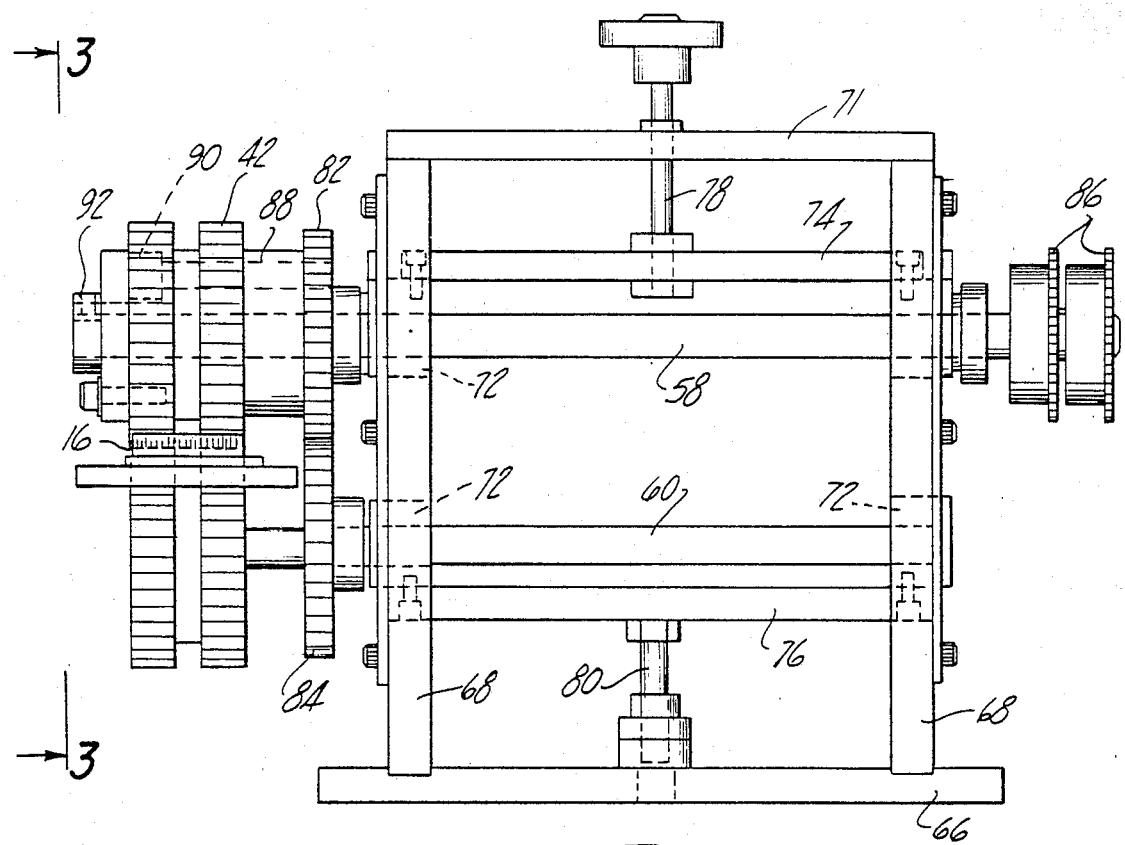
FIG. 2 is a sectional view taken along the line 2—2 in FIG. 1.
Figure 3:
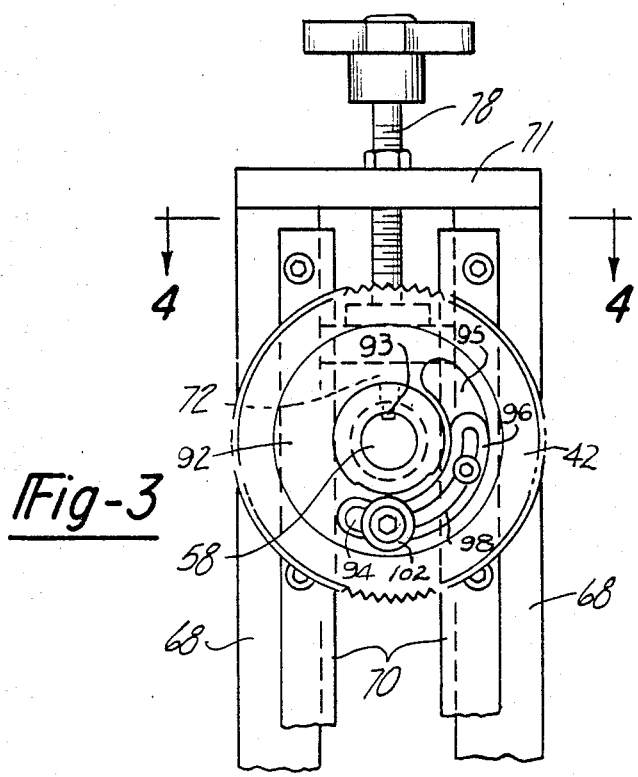
FIG. 3 is a fragmentary view of a portion of the apparatus taken along the line 3—3 in FIG. 2.
Figure 4:
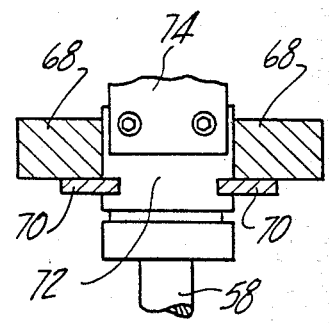
FIG. 4 is a fragmentary sectional view taken along the line 4—4 in FIG. 3.

In FIG. 2 there is shown the manner in which shafts 58,60 for rolls 42,44 are mounted on the frame of the machine and driven. The shafts of rolls 38,40 are mounted on the frame in a similar manner. The machine frame includes a base plate 66. At the location of the roll-supporting shafts there is mounted on base plate 66 a pair of transversely spaced upright plates 68, the plates 68 in each pair being spaced apart laterally and provided with gib plates 70 which form a vertical guideway for bearing blocks 72 in which the rotating shafts are journalled. The upstanding plates 68 at the opposite sides of the frame are interconnected at their upper ends by a top plate 71. In the case of shafts 54,56 and shafts 58,60, the upper bearing blocks 72 are interconnected by a crosspiece 74 and the lower bearing blocks 72 are interconnected by a crosspiece 76. Thus, upper bearing blocks 72 and crosspieces 74 form vertically shiftable yokes for the upper shafts 54,58 and the lower bearing blocks 72 and the crosspieces 76 form vertically shiftable yokes for the lower shafts 56,60. As shown in FIGS. 2 and 3, screws 78 are threaded through the top plates 71 and connect with crosspieces 76 to raise and lower shafts 54,58 in response to rotation of screws 78 in opposite directions. Likewise, adjustment screws 80 extend between base plate 56 and crosspieces 76, the screws being rotatably to raise and lower shafts 56,60. Shafts 62,64 are supported and adjusted in a manner similar to shafts 54,58. It is desirable to make the shafts vertically adjustable so that the toothed rolls can be properly adjusted vertically to obtain the desired engagement of the teeth on these rolls between the crests of the convolutions on the corrugated strip. The shafts are also vertically adjustable to accommodate toothed rolls of different diameters when a strip having a corrugation of a different height is formed by the machine.

The lower rolls 40,44 are dirven at the same speed as the upper rolls 38,42 by meshing gears 82,84. Gears 82,84 on shafts 54,56 are keyed to the shafts while gear 82 is rotatably supported by shaft 58. As explained more fully hereinafter, in the embodiment illustrated in FIG. 1 the shafts 54,56,58,60,62,64 are all rotated at the same speed. The drive arrangement for these shafts include one or more sprockets 86 at the rear ends of shafts 54,58,62,64. All of the sprockets 86 have the same diameter and the same number of teeth. Shafts 54 and 64 are provided with a single sprocket 86, while shafts 58 and 62 are provided with two sprockets. The successive sprockets are connected by separate drive chains (not illustrated) and one of the drive chains is driven by a main drive sprocket which imparts the same intermittent rotary motion to all of the sprockets and each of the toothed rolls 38,40,42,44,46,48.

As pointed out above, the gear 82 on shaft 58 is not keyed to the shaft, but is rotatably mounted thereon. As shown in FIG. 2, this gear 82 is formed with an integral hub 88 which serves as a spacer between roll 42 and gear 82. Roll 42 is connected with hub 88 and gear 82 by a plurality of screws 90 which extend through roll 82 and thread into hub 88.

On the outboard face of roll 42 there is mounted on shaft 58 a bushing 92 which is keyed to shaft 58 as at 93. Thus, bushing 92 is constrained to rotate with shaft 58. As shown in FIGS. 5 and 6, bushing 92 is formed with a shouldered arcuate through slot 94 concentric with shaft 58. Slot 94 has a shallow arcuate extension 95 in which there is slideably arranged an arcuate stop member 96 which is also provided with an arcuate slot 98. A screw 100 extends through slot 98 and is threaded into bushing 92 to retain insert 96 in an arcuately adjusted position on bushing 92. An additional screw 102 extends through arcuate slot 94 and threads into roll 42 and which, when tightened, clamps roll 42 against bushing 92 and thereby causes the roll 42 to rotate with shaft 58. It will be observed that when screw 102 is loosened, roll 42 can be rotated in opposite directions relative to shaft 58 and, when rotated to a desired position, screw 102 can be tightened to clamp roll 42 to bushing 92. Likewise, it will be appreciated that, when screw 100 is loosened, insert 96 can be shifted around arcuate slots 94,95 to a desired position on bushing 92 and then firmly clamped in this position by tightening screw 100 so as to limit the extent of rotative movement of roll 42 relative to bushing 92 when screw 102 is loosened. The extent of rotative adjustment of roll 42 is determined by the adjusted position of arcuate insert 96, the end 104 of which is abutted by the shank of screw 102 when the roll is rotated in a clockwise direction as viewed in FIG. 5. Roll 46 is mounted on shaft 62 and is rotatably adjustable thereon in the same manner as described with respect to roll 42.

To facilitate the explanation of the operation of the above-described arrangement, let us assume that spring plate 22 is adjusted to compress the corrugated strip lengthwise so that in the section thereof between plate 22 and feed rolls 38,40 the spacing of the crests 36 is such that there are sixteen convolutions per inch of strip. Let us further assume that in the finished strip it is desired to have nine convolutions per inch. It is, therefore, apparent that the strip must be stretched to an extent that each finished cut-to-length strip section contains nine uniformly spaced crests per inch. In the present arrangement this is readily accomplished by reason of the particular manner in which rolls 42,46 are adjustably mounted on their respective shafts.

Figure 7:
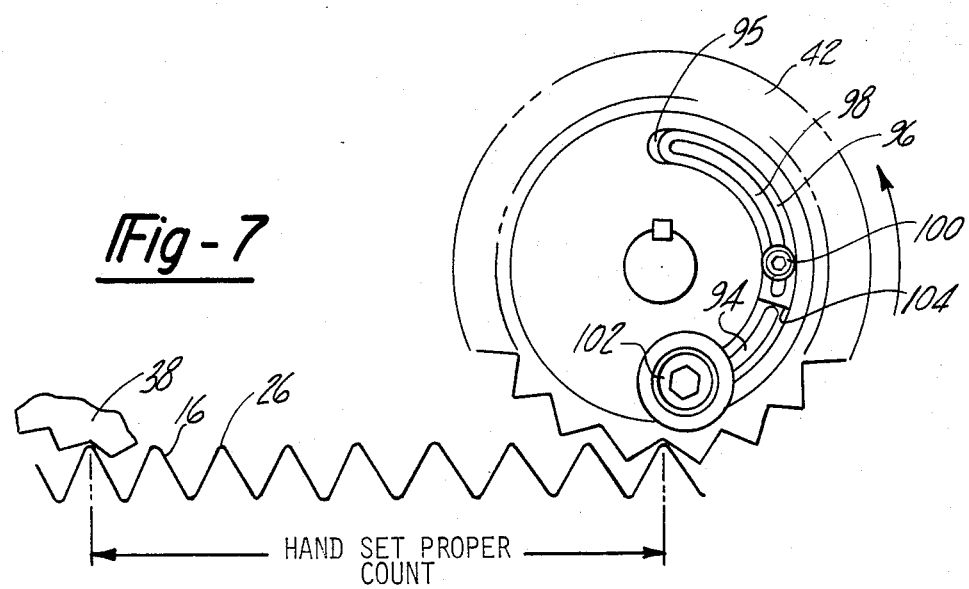
FIGS. 7 and 8 illustrate the manner in which the unpacking rolls are adjusted to stretch the corrugated strip.
Figure 8:
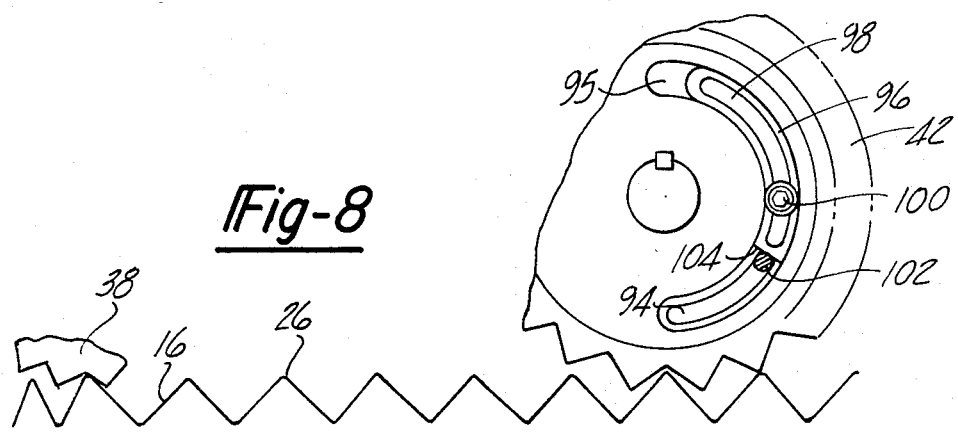

When operation of the apparatus is initiated, the leading end of the corrugated strip is directed between the rotating feed rolls 38,40 and to a position directly adjacent the unpacking rolls 42,44. With the screws 100,102 loosened, roll 38 is rotated slightly in a counter-clockwise direction as shown in FIG. 7 to engage the crests 26 at the leading end of the strip between the teeth on rolls 42,44. It will be appreciated that, since gear 82 is in mesh with gear 84, when roll 42 is rotated, roll 44 will be likewise rotated. The spacing between shafts 54 and 58 in a direction lengthwise of the strip being a known dimension, it then becomes a relatively simple matter to rotate roll 42 in a further counter-clockwise direction so as to stretch the section the strip between rolls 38 and 42 to an extent such that the number of crests between rolls 38,42 correspond to a desired number of crests per unit length. For example, if shafts 54 and 58 are spaced six inches apart and it is desired to increase the spacing of the crests in the section of the strip between these two rolls from sixteen per inch to twelve per inch, then roll 42 is rotated to an extent such that the section of the corrugated strip between rolls 38 and 42 contains 72 crests. After this section of the strip is stretched to this extent screw 102 is tightened and insert 96 is shifted in a counter-clockwise direction in slot 95 to the position shown in FIG. 8 wherein the end 104 of the insert abuts the shank of screw 102. Thereafter, screw 100 is tightened to retain insert 96 in this fixed position relative to bushing 92.

After roll 42 is adjusted as described above, the motor which drives the apparatus is jogged to advance the corrugated strip lengthwise to a position wherein the leading end is located directly adjacent the teeth of roll 46. Roll 46 is then adjusted in the same manner as previously described with respect to roll 42 so as to stretch the section of the corrugated strip between rolls 42 and 46 to an extent so that it contains nine crests per linear inch. Thereafter screw 102 is tightened and the arcuate insert 96 on roll 46 is likewise adjusted and locked in place as previously described.

Since the material from which the corrugated strip is formed has substantially no spring-back, when the apparatus is thereafter operated on a continuous basis the crest spacing on the section of the strip between rolls 38 and 42 will remain at twelve per linear inch and the crest spacing on the section of the strip between rolls 46 and 48 will remain at substantially nine per linear inch. It then becomes a simple matter then to operate rolls 42,46,48 intermittently and reciprocate saw 52 so that the finished corrugated strip is cut into successive sections of desired length. It will be appreciated, however, that in the event the metal from which the corrugated strip is formed has a slight spring-back characteristic, then roll 46 can be adjusted to produce say ten crests per inch, rather than nine.

After the supply of ribbon stock from a coil is exhausted, it becomes necessary to stop the machine, remove the spool of exhausted coil, replace it with a fresh coil and restart the machine. Then, as explained previously, it becomes necessary to again stretch the leading end of the coil between rolls 38 and 42 and between rolls 42 and 46. However, if the crest spacing is to be the same as the coil previously run, then the setting of the unpacking rolls is simplified. Screw 102 on each of the unpacking rolls is loosened, but screw 100 is retained in the tightened position. After the leading end of the corrugated strip is advanced to between the unpacking rolls 42,44, roll 42 is rotated in a counter-clockwise direction to a position wherein the shank of screw 102 abuts the end 104 of insert 96. The section of the corrugated strip between rolls 42 and 46 is thus stretched to the same extent as was the case in the previous coil run through the machine. Likewise, the strip is further advanced into engagement with the teeth of unpacking roll 46. Roll 46 is then rotated in a counter-clockwise direction to a position wherein the shank of screw 102 abuts the end 104 of insert 96. The screw 102 on roll 46 is then tightened so that roll 46 is again adjusted to the same position as in the previously run roll and the section of the corrugated strip between rolls 42 and 46 is thus stretched to the same extent as this section was in the previously run coil.

It will be realized that the pitch of the teeth on rolls 42,44 must be such as to mesh with the crests of the stretched section of the strip between rolls 38 and 42. Likewise, the pitch on the teeth of roll 46 must be such that the teeth mesh properly with the crests of the stretched section of the strip between rolls 42 and 46. Thus, the pitch of the teeth on rolls 38,42,46 progressively increases. It is also important, of course, that the peripheral speeds of the successive rolls are so coordinated as to produce the desired amount of stretch between the successive rolls. In the embodiment illustrated in FIGS. 1 thru 8 the sprockets 86 on shafts 58,62,64 are all the same size and therefore these shafts rotate at the same speed. Therefore, in order to obtain the desired amount of stretch between the successive rolls, roll 42 has a larger diameter than roll 38 and roll 46 has a larger diameter than roll 42. Thus, the peripheral speed of roll 46 is greater than that of roll 42 and the peripheral speed of roll 42 is greater than that of roll 38. If shafts 54,58,62 are rotated at the same speed, then it follows that rolls 42 and 46 must be of such diameter that the number of crests advanced per revolution must be equal for each of the rolls.

Figure 9:
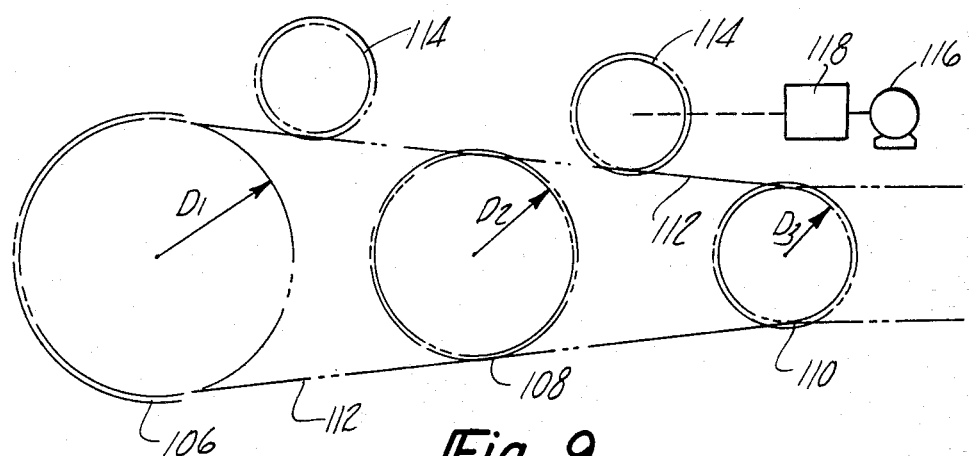
FIG. 9 illustrates in a diagrammatic way a modified drive arrangement for the rolls.

Regardless of the extent to which the corrugated strip is stretched, the crests advanced per unit of time by rolls 42,46 must be the same as roll 38. Under some circumstances, if these rolls are all rotated at the same r.p.m., then rolls 42,46 might have an unduly large diameter. This practical problem can be overcome by rotating rolls 38,42,46 at progressively increasing speeds. Thus, as shown in FIG. 9, the sprocket 106 for the feed rolls 38,40 may have a diameter D1, the sprocket 108 for the first unpacking rolls 42,44 may have a diameter D2 and the sprockets 110 for the second unpacking roll 46 and cut-off roll 48 may have a diameter D3. Chains 112 are driven by drive sprockets 114 at the same lineal speeds. In this case shafts 58,60 will be rotated at a greater speed than shafts 54,56 and shafts 62,64 will be rotated at a greater speed than shafts 58,60. It will be understood, of course, that the relationship between diameters D1, D2 and D3 will depend upon the relationship between diameters and the pitch of the teeth on the feed rolls, the first unpacking rolls and the second unpacking rolls and is such that each roll advances the same number of crests per unit of time.

One or both of the drive sprockets 114 are driven by a motor 116 through any suitable intermittent drive mechanism 118. The mechanism 118 can be controlled by a signal device 120 actuated by pins 122 on roll 48 to momentarily arrest rotation of drive sprockets 114 when a slot 50 in roll 48 registers radially with saw blade 52. This enables the saw blade to sever the corrugated strip precisely at the crest or root of a selected corrugation.

In the illustrated embodiment two spaced unpacking rolls are employed. More or less unpacking rolls may be employed depending upon the extent to which the compacted strip is to be stretched to obtain the desired crest spacing.

I claim:

1. In a machine wherein metal ribbon stock is corrugated transversely by feeding it lengthwise between a pair of toothed corrugating rolls and the corrugated strip is advanced to a rotary driven tooth feed roll in a lengthwise compacted condition wherein the number of convolutions per unit length is greater than desired in the finished strip, said feed roll being adapted to engage the strip between the crests of the successive corrugation and advance it lengthwise in a downstream direction, the improvement which comprises a rotary driven unpacking roll located downstream from the feed roll in the path of travel of the corrugated strip, said unpacking roll having regularly spaced teeth around its outer periphery adapted to engage between the crests of the convolutions of the corrugated strip to advance the strip further in a downstream direction, means permitting rotary adjustment of the unpacking roll relative to the feed roll while the latter is stationary to stretch the section of the corrugated strip engaged by and extending between the two rolls so that the number of convolutions per unit length in said stretched section is less than the number of convolutions per unit length in the portion of the corrugated strip upstream from said feed roll and means for locking the unpacking roll in said rotatably-adjusted position relative to the feed roll.

2. A machine as called for in claim 1 including means downstream from the unpacking roll for severing the stretched corrugated strip into successive sections of predetermined length.

3. A machine as called for in claim 1 wherein the pitch of the teeth on said feed roll corresponds approximately to the spacing between the crests of the successive convolution in said compacted section of the corrugated strip and the pitch of the teeth on the unpacking roll corresponds approximately to the spacing between the crests of the successive convolutions of the stretched section of the corrugated strip.

4. A machine as called for in claim 3 including means for driving the feed roll and the unpacking roll at predetermined speeds, the speed and diameter of the feed roll and the speed and diameter of the unpacking roll being related to the pitch of the teeth thereon such that both rolls engage and advance the same number of crests in the same time interval.

5. A machine as called for in claim 1 wherein the means permitting rotary adjustment and locking of said unpacking roll comprises a drive shaft for said unpacking roll, said unpacking roll being rotatably adjustable on said drive shaft and means for locking the unpacking roll to the drive shaft in an adjusted position.

6. A machine as called for in claim 5 including a stop member on said shaft adjustable circumferentially thereof, means on said unpacking roll adapted to engage said stop member when the unpacking roll is rotated in a direction to stretch the strip to thereby permit the unpacking roll to be repeatedly adjusted to the same position relative to said drive shaft.

7. A machine as called for in claim 1 wherein the means permitting rotary adjustment and locking of said unpacking roll comprises a drive shaft on which said unpacking roll is rotatably adjustable, means for locking the unpacking roll to rotate with a drive shaft in the adjusted position of the unpacking roll, said locking means comprising a bushing keyed to said shaft to rotate therewith and means for fixedly securing the unpacking roll to said bushing.

8. A machine as called for in claim 7 wherein said securing means comprises an arcuate slot in said bushing concentric with the axis of the shaft and a screw extending through said slot and threaded into said unpacking roll, said screw, when tightened, clamping the roll against said bushing.

9. A machine as called for in claim 8 including a stop member adjustable circumferentially in said slot and adapted to be abutted by said screw to limit rotation of the unpacking roll on said shaft in a direction which stretches said section of the corrugated strip and means for locking said stop in a circumferentially adjusted position on said bushing.

10. A machine as called for in claim 1 including a second rotary driven unpacking roll located downstream from the first-mentioned unpacking roll in the path of travel of the strip, said second unpacking roll having a plurality of teeth around its periphery adapted to engage between the crests of the corrugations on the strip to advance the strip further in said downstream direction, means for rotatably adjusting the second unpacking roll relative to the first while the latter is stationary to further stretch the section of the strip between the first and second unpacking rolls so that the number of convolutions per unit length is less in the last-mentioned section than in the first-mentioned stretched section and means for locking the second unpacking roll in said rotatably adjusted position relative to the first unpacking roll.

11. A machine as called for in claim 10 including means for rotating said feed roll and said unpacking rolls, the speed and diameter of the feed roll and the first and second unpacking rolls being related to the pitch of the teeth on the respective rolls so that each roll advances the same number of convolutions per unit of time.

12. The method of making a transversely corrugated heat exchanger strip which comprises feeding a metal ribbon between a pair of corrugated rolls to impart a zig-zag configuration to the ribbon; compressing the corrugated strip lengthwise to further bend the crests of the corrugations and to compress the strip to a condition wherein the number of convolutions per unit length is greater than desired in the finished strip; advancing the compacted corrugated strip to a rotary-driven feed roll having a plurality of regularly spaced teeth around its periphery adapted to engage between the successive crests to feed the compacted strip lengthwise; advancing the strip to a rotary unpacking roll located downstream from the feed roll in the path of travel of the strip, said unpacking roll also having a plurality of regularly spaced teeth around its periphery adapted to engage between the crests of the corrugated strip and advance it in a further downstream direction; maintaining the feed roll stationary and rotating the unpacking roll while engaged with the corrugations of said strip to stretch the section of the strip between the feed roll and the unpacking roll so that the number of convolutions per unit length therebetween is less than in the compacted strip and thereafter simultaneously rotating the feed roll and the unpacking roll such as to maintain the section of the advancing strip therebetween in said stretched condition.

13. The method called for in claim 12 wherein the feed roll and the unpacking roll are rotated so that each advances the same number of convolutions per unit of time.

14. The method called for in claim 13 wherein the feed roll and the unpacking roll are rotated at the same angular velocity, the diameter and the pitch of the teeth on the unpacking roll being greater than the diameter and pitch of the teeth on the feed roll.

15. The method called for in claim 13 wherein the unpacking roll is rotated at a greater angular velocity than the feed roll.

16. The method called for in claim 12 including the step of arresting rotation of the feed roll and the unpacking roll momentarily at regularly spaced intervals and severing the strip at a location downstream from said unpacking roll during the time interval that rotation of the feed and unpacking rolls is arrested.

* * * * *